United States Patent
Peterka

(10) Patent No.: US 7,310,809 B2
(45) Date of Patent: Dec. 18, 2007

(54) SCALABLE PAY-BY-TIME TECHNIQUE FOR SECURE MULTICAST DISTRIBUTION OF STREAMING CONTENT

(75) Inventor: Petr Peterka, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 937 days.

(21) Appl. No.: 09/802,421

(22) Filed: Mar. 9, 2001

(65) Prior Publication Data

US 2002/0138826 A1 Sep. 26, 2002

Related U.S. Application Data

(60) Provisional application No. 60/205,388, filed on May 19, 2000.

(51) Int. Cl.
   *H04N 7/16* (2006.01)
   *H04N 7/173* (2006.01)

(52) U.S. Cl. .............................. 725/87; 725/1; 725/93; 725/97; 725/100

(58) Field of Classification Search .............. 725/1–8, 725/87, 93, 95, 97, 100; 709/204, 205; 705/412, 705/400; 380/273, 211; 370/260
   See application file for complete search history.

(56) References Cited

U.S. PATENT DOCUMENTS

| | | | |
|---|---|---|---|
| 4,736,422 A | 4/1988 | Mason | |
| 5,003,384 A | 3/1991 | Durden et al. | |
| 5,159,633 A | 10/1992 | Nakamura | |
| 5,594,794 A * | 1/1997 | Eyer et al. | 380/231 |
| 5,659,615 A | 8/1997 | Dillon | |
| 5,748,737 A | 5/1998 | Draggar | |
| 5,758,068 A | 5/1998 | Brandt et al. | |
| 5,790,198 A | 8/1998 | Roop | |
| 5,850,218 A * | 12/1998 | LaJoie et al. | 725/45 |
| 5,878,135 A | 3/1999 | Blather et al. | |
| 5,936,659 A | 8/1999 | Viswanathan et al. | |
| 5,949,411 A | 9/1999 | Doerr et al. | |
| 6,041,316 A | 3/2000 | Allen | |
| 6,067,623 A | 5/2000 | Blakley, III et al. | |
| 6,097,816 A | 8/2000 | Momiki et al. | |
| 6,385,596 B1 | 5/2002 | Wiser et al. | |
| 6,510,515 B1 | 1/2003 | Raith | |
| 6,802,077 B1 * | 10/2004 | Schlarb | 725/104 |
| 2001/0031044 A1 | 10/2001 | Katz | |
| 2002/0002674 A1 | 1/2002 | Grimes et al. | |

OTHER PUBLICATIONS

Mittra. Suvo, Iolus: A Framework for Scalable Secure Multicasting, Sep. 1997, Proceedings of the ACM SIGCOMM '97.*
Fei, Zongming, et al., "Providing Interactive Functions for Staggered Miltcast Near Video-On-Deman Systems," IEEE 1999, pp. 949-953.

* cited by examiner

*Primary Examiner*—Kieu-Oanh T Bui
(74) *Attorney, Agent, or Firm*—Benjamin D. Driscoll

(57) ABSTRACT

A method for receiving information content from an information distribution system, wherein the information content is divided into a plurality of content portions, the method comprising: subscribing to a multicast group representing at least one content portion; and determining, at the end of a content portion, whether to subscribe to another multicast group.

18 Claims, 3 Drawing Sheets

FIG. 2

SCALABLE PAY-BY-TIME TECHNIQUE FOR SECURE MULTICAST DISTRIBUTION OF STREAMING CONTENT

CROSS-REFERENCES TO RELATED APPLICATIONS

This application claims priority from provisional application No. 60/205,388, filed May 19, 2000, the disclosure of which is incorporated herein by reference for all purposes.

FIELD OF THE INVENTION

This invention relates generally to the field of information content distribution, and more particularly to a scalable pay-by-time system for secure content distribution.

BACKGROUND OF THE INVENTION

It is expected that the concept of paying by time watched rather than paying for an entire movie will be a viable business model for distributing multimedia content over the Internet. The concept may not be suitable for movies which have a well defined start time and duration and for which the majority of viewers want to watch the entire movie or nothing. However, content such as ongoing world news, fashion shows, general entertainment with music, skits, dance, etc., would benefit from options to sell only a part of such content based on actual time spent watching.

Most known techniques do not scale well to the number of users expected to be serviced on the Internet. Most published algorithms are suitable for specific constraint domains, such as video teleconferencing, which usually have a relatively small number of participants. Other algorithms do not scale well because of a high requirement on the number of messages sent when a participant leaves the group, or a large number of keys stored by each participant. None of these techniques are suitable for a broadcast-like distribution of video over the Internet.

In prior techniques, when a member of a multicast group wanted to leave the group, the rest or a large portion of the group might have to be given a new set of security keys to ensure security. This is an expensive and time consuming operation, especially when the group is very large (e.g., millions of viewers).

SUMMARY OF THE INVENTION

The present invention includes a system that provides a pay-by-time mechanism for a multicast distribution of multimedia content. The system according to the present invention eliminates the scalability bottleneck of other approaches when a large number of participants leave a group.

In an embodiment of a method according to the present invention, information content is received from an information distribution system, wherein the information content is divided into a plurality of content portions. The method comprises: subscribing to a multicast group representing at least one content portion; and determining, at the end of a content portion, whether to subscribe to another multicast group.

In an embodiment of an apparatus according to the present invention, information content is received from an information distribution system, wherein the information content is divided into a plurality of content portions. The apparatus comprises: a transceiver coupled with the information distribution system; a processor coupled with the transceiver; instructions, operable on by the processor, for subscribing to a multicast group representing at least one content portion; and instructions, operable on by the processor, for determining at the end of a content portion whether to subscribe to another multicast group.

In an embodiment of an apparatus according to the present invention, information content is received from an information distribution system, wherein the information content is divided into a plurality of content portions. The apparatus comprises: a transceiver coupled with the information distribution system; and a processor coupled with the transceiver, wherein the processor is operable on instructions for subscribing to a multicast group representing at least one content portion; and the processor is operable on instructions for determining, at the end of a content portion, whether to subscribe to another multicast group.

In an embodiment of computer-readable media according to the present invention, a computer system is directed to facilitate the receipt of information content from an information distribution system, wherein the information content is divided into a plurality of content portions. The computer-readable media comprises: instructions for subscribing to a multicast group representing at least one content portion; and instructions for determining, at the end of a content portion, whether to subscribe to another multicast group.

In an embodiment of a signal embodied in a carrier wave according to the present invention, the signal is generated by a method. The method comprises: subscribing to a multicast group representing at least one content portion; and determining, at the end of a content portion, whether to subscribe to another multicast group.

In an embodiment of a system according to the present invention, information content is received from an information distribution system, wherein the information content is divided into a plurality of content portions. The system comprises: means for subscribing to a multicast group representing at least one content portion; and means for determining, at the end of a content portion, whether to subscribe to another multicast group.

DESCRIPTION OF THE SPECIFIC EMBODIMENTS

Figure 1:
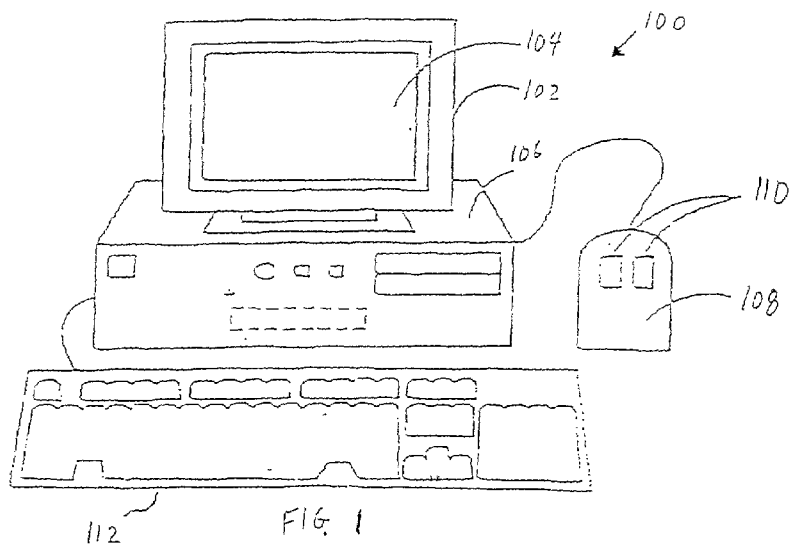
FIG. 1 is an illustration of a computer system suitable for use with the present invention.

As shown in the exemplary drawings wherein like reference numerals indicate like or corresponding elements among the figures, an embodiment of a system according to the present invention will now be described in detail. The description describes an exemplary apparatus suitable to implement an embodiment of the present invention. Methods of operation and associated user interface details in accordance with the invention are also provided.

FIG. 1 shows a computer system 100 suitable for use to provide a system in accordance with the present invention. The computer system 100 includes a display 102 having a display screen 104. A cabinet 106 houses standard computer components (not shown) such as a disk drive, CD-ROM drive, display adapter, network card, random access memory (RAM), central processing unit (CPU) and other components, subsystems and devices. User input devices such as a mouse 108 having buttons 110, and a keyboard 112 are shown. Other user input devices such as a trackball, touchscreen, digitizing tablet, etc., can be used. In general, the computer system 100 is illustrative of one type of computer system, such as a desktop computer, suitable for use with the present invention. Computers can be configured with many different hardware components and can be made in many dimensions and styles (e.g., laptop, palmtop, server, workstation and mainframe). Thus, any hardware platform suitable for performing the processing described herein is suitable for use with the present invention.

Figure 2:
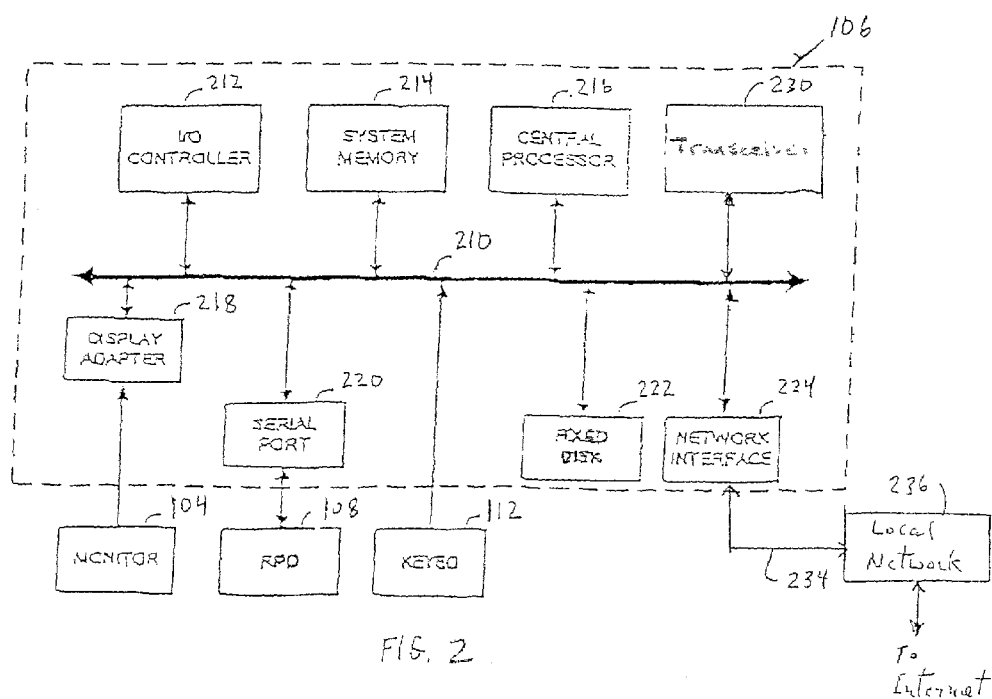
FIG. 2 shows subsystems in the computer system of FIG. 1.

FIG. 2 illustrates subsystems found in the computer system 100. Subsystems within box 106 are directly interfaced to an internal bus 210. The subsystems include input/output (I/O) controller 212, system random access memory (RAM) 214, central processing unit (CPU) 216, display adapter 218, serial port 220, fixed disk 222, network interface adapter 224 and transceiver 230. The use of the bus allows each of the subsystems to transfer data among the subsystems and, most importantly, with the CPU. External devices can communicate with the CPU or other subsystems via the bus by interfacing with a subsystem on the bus. The monitor 104 connects to the bus through the display adapter 218. A relative pointing device (RPD) such as a mouse 108 connects through the serial port. Some devices such as keyboard 112 can communicate with the CPU by direct means without using the main data bus as, for example, via an interrupt controller and associated registers (not shown). The transceiver 230 can be coupled with a satellite system, cable system, telephone lines or any other system suitable for propagating information. The transceiver can include or be coupled with a communication interface, which can be coupled with bus 210.

FIG. 2 is illustrative of one suitable configuration for providing a system in accordance with the present invention. Subsystems, components or devices other than those shown in FIG. 2 can be added without deviating from the scope of the invention. A suitable computer system can also be achieved without using all of the subsystems shown in FIG. 2. Other subsystems such as a CD-ROM drive, graphics accelerator, etc., can be included in the configuration without affecting the performance of the system included in the present invention.

The invention is related to the use of apparatus, such as the computer system 100, for implementing a scalable pay-by-time technique for the secure multicast distribution of streaming content, including, but not limited to, video and audio. According to one embodiment of the invention, multicast distribution is provided by the computer system 100 in response to the processor 216 executing one or more sequences of one or more instructions contained in the system memory 214. Such instructions may be read into memory 214 from a computer-readable medium, such as a fixed disk 222. Execution of the sequences of instructions contained in the memory 214 causes the processor to perform the process steps described herein. One or more processors in a multi-processing arrangement may also be employed to execute the sequences of instructions contained in the memory. In alternative embodiments, hard-wired circuitry may be used in place of or in combination with software instructions to implement the invention. Thus, embodiments of the invention are not limited to any specific combination of hardware circuitry and software.

The terms "computer-readable medium" and "computer-readable media" as used herein refer to any medium or media that participate in providing instructions to the processor 214 for execution. Such media can take many forms, including, but not limited to, non-volatile media, volatile media and transmission media. Non-volatile media include, for example, optical or magnetic disks, such as a fixed disk 222. Volatile media include dynamic memory, such as memory 214. Transmission media include coaxial cables, copper wire and fiber optics, including the wires that comprise the bus 210. Transmission media can also take the form of acoustic or light waves, such as those generated during radio frequency (RF) and infra-red (IR) data communications. Common forms of computer-readable media include, for example, a floppy disk, a flexible disk, a hard disk, magnetic tape, any other magnetic medium, a CD-ROM disk, DVD, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read.

Various forms of computer-readable media may be involved in carrying one or more sequences of one or more instructions to processor 216 for execution. For example, the instructions may initially be borne on a magnetic disk of a remote computer. The remote computer can load the instructions into its dynamic memory and send the instructions over a telephone line using a modem. A modem local to the computer system 100 can receive the data on the telephone line and use an infrared transmitter to convert the data to an infrared signal. An infrared detector coupled with the bus 210 can receive the data carried in the infrared signal and place the data on the bus. The bus carries the data to the memory 214, from which the processor retrieves and executes the instructions. The instructions received by the memory can optionally be stored on the fixed disk 222 either before or after execution by the processor.

The computer system 100 also includes a network interface 224 or communication interface coupled to the bus 210. The network interface or communication interface provides a two-way data communication coupling with a network link 234 that is connected to a local network 236. For example, the network interface or communication interface can be an integrated services digital network (ISDN) card or a modem to provide a data communication connection to a corresponding type of telephone line. As another example, the network interface or communication interface can be a local area network (LAN) card to provide a data communication connection to a compatible LAN. Wireless links can also be implemented. In any such implementation, the network interface 224 or the communication interface and transceiver 230) send and receives electrical, electromagnetic or optical signals that carry digital data streams representing various types of information.

The network link 234 typically provides data communication through one or more networks to other data devices. For example, the network link can provide a connection through the local network 236 to a host computer or to data equipment operated by an Internet Service Provider (ISP). The ISP in turn provides data communication services through the worldwide packet data communication network, now commonly referred to as the "Internet." The local network and the Internet both use electrical, electromagnetic or optical signals that carry digital data streams. The signals that propagate through the various networks and the signals on the network link and that propagate through the network interface 224, and the signals that propagate through the transceiver 230, which carry the digital data to and from computer system 100, are exemplary forms of carrier waves transporting the information.

The computer system 100 can send messages and receive data, including user commands, video data, audio data and program codes through the network(s), the network link 234, and the network interface 224. In the Internet example, a server might transmit a requested code for an application program through the ISP, Internet, local network 236 and network interface 224. Instead of or in addition to transmission via the Internet, the computer system 100 can send and receive data via the transceiver 230 and a wireless system, satellite system, cable system, telephone lines or any other system suitable for propagating information between the computer system and an information distribution system. In accordance with the invention, one such downloaded application provides for a scalable pay-by-time technique for secure multicast distribution of streaming content as described herein. The processor 216 can execute the received code as the code is received, and/or store the code on the fixed disk 222, or other non-volatile storage for later execution. In this manner, the computer system can obtain an application code in the form of a carrier wave.

It is contemplated that various hardware components can be added to the present system. Some examples of these components include set-top boxes, interactive televisions, mobile devices and cellular phones.

In accordance with embodiments of the present invention, information content is divided into discrete pay periods (Pn) and re-key periods (Kn). Pay periods can be multiples of re-key periods and may be aligned with re-key periods. The participants (users) of the multicast distribution group are divided into groups based on how much time they expect to watch the content. There are two main multicast groups: (1) a group which represents the entire duration of the content and (2) a group which represents the smallest pay increment (e.g.,15 minutes). It is envisioned that the smallest pay increment can be more or less than 15 minutes.

When a new consumer joins the multicast, he has an option to pay for the entire content, thus joining the group representing the entire content, or to join the smaller increment group, which allows him to watch only a small portion of the content and decide later how much he wants to watch. Each multicast group represents at least one content portion (e.g., a pay period). At the end of the increment period (group), the consumer has 3 options: (1) stop watching (cease receiving content), (2) join the group that represents the rest of the content, or (3) buy another increment. Payment can be accepted from an end user in accordance with the number of content portions subscribed to.

As mentioned above, in previous systems, when a member of a multicast group (a user) desires to leave his group (i.e., stop accessing content), the rest or a large portion of the group must be given a new set of keys. When the multicast group is large, this becomes an expensive and time consuming process. The present system solves this problem by allowing individual users to stop accessing content at the end of content portions (e.g., pay periods). New security keys are given out for each content portion, and do not have to be given out every time a user leaves the multicast group.

Figure 3:
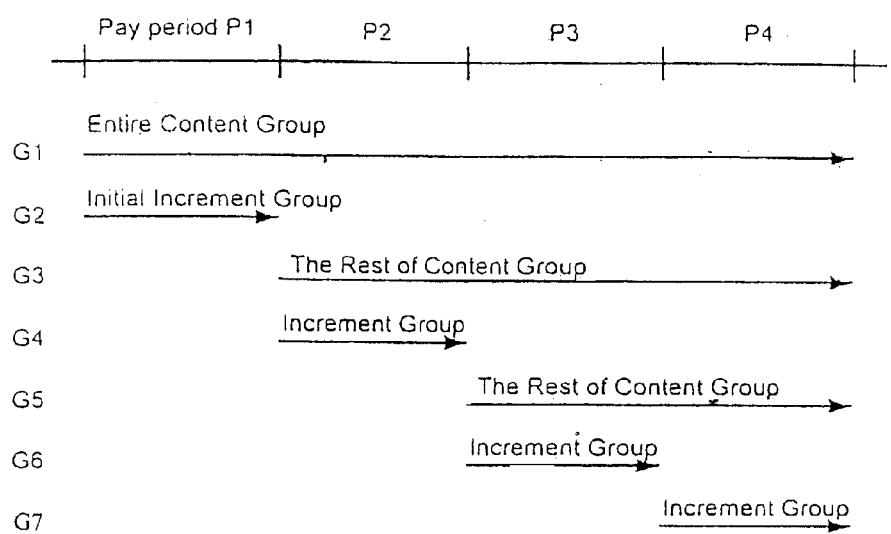
FIG. 3 shows the division and grouping of content in accordance with the present invention.

FIG. 3 shows the division and grouping of content in accordance with the present invention. In general, if the content is divided into N pay periods then there are up to G defined groups, where in one embodiment $G=\Sigma(N-k)$, where k goes from 0 to N. In other embodiments, $G=2N-1$ and $G=N+1$, as will be discussed below.

At any given moment, the participant may decide to join any group that represents an incremental portion of the content. For clarity, FIG. 3 shows only a subset of the possible groups, so that there are only two choices which the continuing participant has when his group lifetime expires. For example, if the participant had initially joined G2, then at the end of the first pay period (P1) the participant could: (1) to join the group that represents the rest of the content (e.g., group G3) or (2) buy another increment by joining the next increment group (e.g., group G4).

Figure 4:
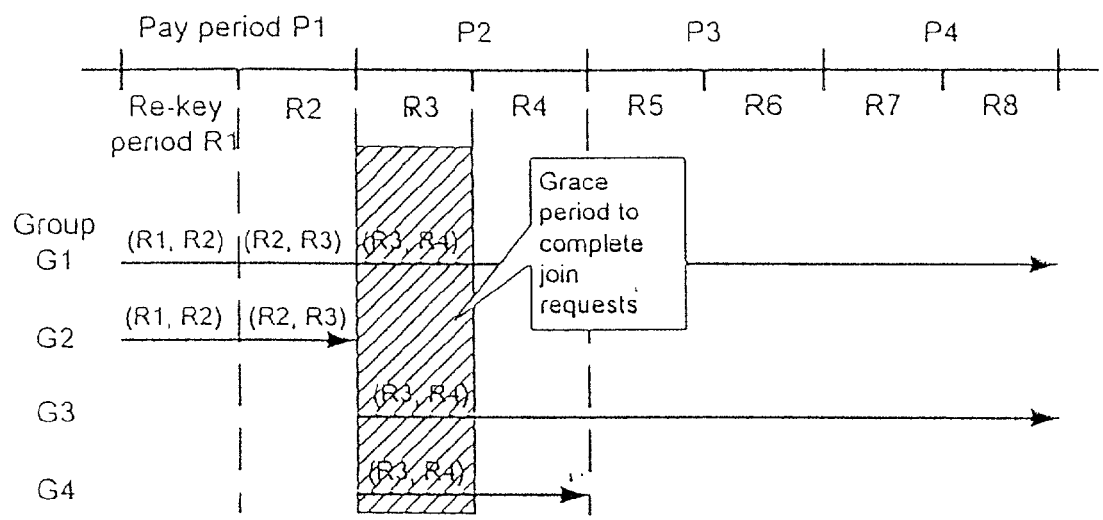
FIG. 4 shows re-key periods in accordance with the present invention.

FIG. 4 shows how the pay periods are further divided into re-key periods in accordance with the present invention. The result of joining groups at the end of a pay period may be a flood of join requests right at the pay period boundaries and may cause a bottleneck problem when scaled to high numbers of participants. Thus, to avoid that problem, in one embodiment of the invention each pay period is divided into two or more re-key periods. When a participant joins a multicast group, he is given a first security key for the current re-key period and a second security key for the next re-key period. More specifically, security keys are associated with the multicast group. A unique key is associated with each group. For example, when the current pay period ends, the participant still has a key to access the next re-key period, which is part of the next pay period. During this time, the system may add the participant into a new group of his choice. The longer the re-key periods are, the more join requests that can be handled by the system. A request to join a multicast group does not have to be completed until the end of the subsequent re-key period.

Each group has its own group key (or session key) which is used to encrypt the individual keys for the re-key period. When a user joins a particular multicast group, he is given that group's group key. The system needs to deliver to the group the current and the next key, and this can be done simultaneously or at close to the same time in one embodiment. The keys can be delivered in a multicast fashion. The actual content can be encrypted under the key associated with the current re-key period or a separate content encryption key which is delivered encrypted under the re-key period key. The group key does not have to change, since there may be no way to leave the group. The system maintains up to G number of groups for each content stream (see above). A user may join a multicast group but may not be removed from it. When the group expires (the associated increment periods are over), no re-key period keys are distributed under that group key.

In other embodiments of the invention, system optimizations are possible. For example, if a participant joins the initial increment period G2, he receives keys for re-key period R1 and R2 and later R3. When the client software recognizes that the initial period is over, it may present the user with an option to buy the rest of the content or join the next increment group. The entire duration of the next re-key period R3 (the grace period) is available to finish the join request without any interruption of the content.

Therefore, embodiments of the present invention support configurable discrete increments of time quanta. The user makes an up-front decision on how much he wants to watch and if he wants to continue watching at the end of the period he has subscribed to. In one embodiment, in order to avoid excessive user interaction, initial configuration options are used to set up user preferences. For example, the user could set the default of the system to be such that if the user does nothing to terminate the receipt of content then the user automatically receives the entire content during the first pay period or after the first pay period is over; alternatively, the user can be automatically propagated only to the next pay period in this case. The user may have to make a positive request to join a subsequent multicast group. The user may have to make a negative request not to be propagated to a subsequent multicast group.

In one embodiment, rather than sending a positive request to join the next group, the user must send a "leave" request; otherwise, the user will be automatically propagated to the group associated with the next pay period. This is beneficial if a user joins two or more subsequent pay periods on average.

In other embodiments of the invention, various optimizations may be employed to simplify operation and improve efficiency. For example, in the general case where the content is divided into N pay periods, the groups are defined by $G=\Sigma(N-k)$, where k goes from 0 to N. In one embodiment, the system is simplified by supporting only two types of groups: (1) the increment groups and (2) the rest-of-the-content groups. Since there are N increment groups and N−1 rest-of-the-content groups, this simplification brings the number of groups down to 2N−1.

In another embodiment, the system is further simplified by providing one group which represents the entire content, and N increment groups, which brings the number of groups to N+1.

In another embodiment of the invention, the first increment period the user subscribes to may be treated as anytime-free-preview. If the user decided not to subscribe to any other subsequent periods, he may not be charged for any time.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A method for receiving information content from an information distribution system, wherein the information content is divided into a plurality of time-limited portions, the method comprising:
   prompting for a pay-by-time subscription to either a first multicast group that receives a first time-limited portion of the entire information content or a second multicast group that receives a second time-limited portion of the entire information content wherein the first time-limited portion of the entire information content and the second time-limited portion of the entire information content at least partially overlap;
   receiving a selection to subscribe to either the first multicast group or the second multicast group;
   providing either the first time-limited portion of the entire information content or the second time-limited portion of the entire information content depending on the selection; and
   prompting for a pay-by-time subscription to a third multicast group wherein the third multicast group receives a third time-limited portion of the entire information content and wherein the prompting for the pay-by-time subscription to the third multicast group occurs after the selection to subscribe to the second multicast group and substantially near the end of the second time-limited portion of the entire information content wherein the first time-limited portion of the entire information content and the third time-limited portion of the entire information content at least partially overlap and the second time-limited portion of the entire information content and the third time-limited portion of the entire information content at least partially overlap.

2. The method of claim 1 wherein a length of the third time-limited portion of the entire information content is substantially equal to a length of the entire information content minus a length of the second time-limited portion of the entire information content.

3. The method of claim 1 further comprising:
   prompting for a pay-by-time subscription to a fourth multicast group wherein the fourth multicast group receives a fourth time-limited portion of the entire information content wherein the prompting for a pay-by-time subscription to the forth multicast group occurs after the selection of the second multicast group and substantially near the end of the second time-limited portion of the entire information content.

4. The method of claim 1 wherein a total number of multicast groups is defined by $\Sigma(N-k)$ where N represents a number of time-limited portions the entire information content can be divided into and k goes from 0 to N.

5. The method of claim 1 wherein a total number of multicast groups is defined by 2N−1 where N represents a number of time-limited portions the entire information content can be divided into.

6. The method of claim 1 wherein a total number of multicast groups is defined by N+1 where N represents a number of time-limited portions the entire information content can be divided into.

7. An apparatus for receiving information content from an information distribution system, wherein the information content is divided into a plurality of time-limited portions, the apparatus comprising:
   a transceiver coupled to the information distribution system;
   a processor coupled to the transceiver wherein the processor operates by following instructions such that the processor;
   prompts for a pay-by-time subscription to either a first multicast group that receives a first time-limited portion of the entire information content or a second multicast group that receives a second time-limited portion of the entire information content wherein the first time-limited portion of the entire information content and the second time-limited portion of the entire information content at least partially overlap;
   receives a selection to subscribe to either the first multicast group or the second multicast group;
   provides either the first time-limited portion of the entire information content or the second time-limited portion of the entire information content depending on the selection; and
   prompts for a pay-by-time subscription to a third multicast group wherein the third multicast group receives a third time-limited portion of the entire information content and wherein the prompting for subscription to the third multicast group occurs after the selection to subscribe to the second multicast group and substantially near the end of the second time-limited portion of the entire information content wherein the first time-limited portion of the entire information content and the third time-limited portion of the entire information content at least partially overlap and the second time-limited portion of the entire information content and the third time-limited portion of the entire information content at least partially overlap.

8. The apparatus of claim 7 wherein a length of the third time-limited portion of the entire information content is substantially equal to a length of the entire information content minus a length of the second time-limited portion of the entire information content.

9. The apparatus of claim 7 wherein the processor operates by following further instructions such that the processor:
prompts for a pay-by-time subscription to a fourth multicast group wherein the fourth multicast group receives a fourth time-limited portion of the entire information content wherein the prompting for subscription to the forth multicast group occurs after the selection of the second multicast group and substantially near the end of the second time-limited portion of the entire information content.

10. The apparatus of claim 7 wherein a total number of multicast groups is defined by $\Sigma(N-k)$ where N represents a number of time-limited portions the entire information content can be divided into and k goes from 0 to N.

11. The apparatus of claim 7 wherein a total number of multicast groups is defined by $2N-1$ where N represents a number of time-limited portions the entire information content can be divided into.

12. The apparatus of claim 7 wherein a total number of multicast groups is defined by $N+1$ where N represents a number of time-limited portions the entire information content can be divided into.

13. A computer-readable storage media for directing a computer to receive information content from an information distribution system, wherein the information content is divided into a plurality of time-limited portions, the computer-readable media comprising executable instructions that control the computer to:
prompt for a pay-by-time subscription to either a first multicast group that receives a first time-limited portion of the entire information content or a second multicast group that receives a second time-limited portion of the entire information content wherein the first time-limited portion of the entire information content and the second time-limited portion of the entire information content at least partially overlap;
receive a selection to subscribe to either the first multicast group or the second multicast group;
provide either the first time-limited portion of the entire information content or the second time-limited portion of the entire information content depending on the selection; and
prompt for a pay-by-time subscription to a third multicast group wherein the third multicast group receives a third time-limited portion of the entire information content and wherein the prompting for subscription to the third multicast group occurs after the selection to subscribe to the second multicast group and substantially near the end of the second time-limited portion of the entire information content wherein the first time-limited portion of the entire information content and the third time-limited portion of the entire information content at least partially overlap and the second time-limited portion of the entire information content and the third time-limited portion of the entire information content at least partially overlap.

14. The computer-readable media of claim 13 wherein a length of the third time-limited portion of the entire information content is substantially equal to a length of the entire program content minus a length of the second time-limited portion of the entire information content.

15. The computer-readable media of claim 13 further comprising instructions that further control the computer to:
prompt for a pay-by-time subscription to a fourth multicast group wherein the fourth multicast group receives a fourth time-limited portion of the entire information content wherein the prompting for subscription to the forth multicast group occurs after the selection of the second multicast group and substantially near the end of the second time-limited portion of the entire information content.

16. The computer-readable media of claim 13 wherein a total number of multicast groups is defined by $\Sigma(N-k)$ where N represents a number of time-limited portions the entire information content can be divided into and k goes from 0 to N.

17. The computer-readable media of claim 13 wherein a total number of multicast groups is defined by $2N-1$ where N represents a number of time-limited portions the entire information content can be divided into.

18. The computer-readable media of claim 13 wherein a total number of multicast groups is defined by $N+1$ where N represents a number of time-limited portions the entire information content can be divided into.

* * * * *